US007664294B2

(12) United States Patent
Sacher et al.

(10) Patent No.: US 7,664,294 B2
(45) Date of Patent: Feb. 16, 2010

(54) SYSTEM FOR AUTOMATIC QUALITY INSPECTION OF A PRINTED IMAGE, COMPRISING AN IMAGE SENSOR, EVALUATION UNIT AND DISPLAY

(75) Inventors: Jörn Sacher, Hiddenhausen (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 619 days.

(21) Appl. No.: 10/554,695

(22) PCT Filed: Apr. 30, 2004

(86) PCT No.: PCT/EP2004/050662

§ 371 (c)(1),
(2), (4) Date: Oct. 27, 2005

(87) PCT Pub. No.: WO2004/096547

PCT Pub. Date: Nov. 11, 2004

(65) Prior Publication Data

US 2006/0230358 A1 Oct. 12, 2006

(30) Foreign Application Priority Data

May 2, 2003 (DE) ................................ 103 19 771

(51) Int. Cl.
*G06K 9/00* (2006.01)
*G06F 3/048* (2006.01)
*H04N 7/18* (2006.01)

(52) U.S. Cl. ....................... 382/112; 382/141; 715/771; 715/965; 348/88

(58) Field of Classification Search ................. 382/112, 382/108, 141; 715/771, 965, 966, 970; 348/88
See application file for complete search history.

(56) References Cited

U.S. PATENT DOCUMENTS 5,353,400 A * 10/1994 Nigawara et al. ........... 715/771
5,363,446 A 11/1994 Ruppertz et al.

(Continued)

FOREIGN PATENT DOCUMENTS

DE 41 23 126 C1 6/1992

(Continued)

OTHER PUBLICATIONS

McEvers, J.A., et al. Development of an On-Line Modular Printed-Web Inspection System. Proceedings of the SPIE, 1993, vol. 2064, pp. 152-165.*

(Continued)

*Primary Examiner*—Bhavesh M Mehta
*Assistant Examiner*—Barry Drennan
(74) *Attorney, Agent, or Firm*—Jones, Tullar & Cooper, P.C.

(57) ABSTRACT

A system is provided for inspecting a printed image. The system is provided with at least one evaluation unit, a display device and an image scanner. That scanner takes an image that represents, at least partially, a printed image. The copied printed image belongs to a sequence of images printed on a print carrier by a printing machine. The evaluation unit receives data that is correlated to an image which has been taken, and evaluates that data by comparing it with recorded data of at least one preceding image, or with a reference image. The display device is provided with a graphic display surface that is comprised of several areas which are controlled, in a different manner, by the evaluation unit, and which are preferably simultaneously displayed. A first area displays several images, such as the just taken image, the preceding image and the reference image. The second area includes an input field or a control point for adjusting or controlling the evaluation unit or for adjusting or controlling the printing machine.

33 Claims, 1 Drawing Sheet

U.S. PATENT DOCUMENTS

| | | | | | |
|---|---|---|---|---|---|
| 5,857,784 | A * | 1/1999 | Allen | 400/74 |
| 5,974,967 | A * | 11/1999 | Bravenec et al. | 101/211 |
| 6,026,172 | A * | 2/2000 | Lewis et al. | 382/106 |
| 6,050,192 | A * | 4/2000 | Kipphan et al. | 101/232 |
| 6,112,658 | A * | 9/2000 | Gunther et al. | 101/171 |
| 6,119,594 | A | 9/2000 | Kipphan et al. | |
| 6,266,437 | B1 * | 7/2001 | Eichel et al. | 382/149 |
| 6,377,247 | B1 | 4/2002 | Halverson et al. | |
| 6,449,385 | B1 * | 9/2002 | Huber et al. | 382/112 |
| 6,496,219 | B1 * | 12/2002 | Porret et al. | 348/88 |
| 6,556,704 | B1 * | 4/2003 | Chen | 382/154 |
| 6,621,585 | B1 | 9/2003 | Patel et al. | |
| 6,883,431 | B2 | 4/2005 | Fischer et al. | |
| 2001/0012389 | A1 * | 8/2001 | Welchman et al. | 382/141 |
| 2002/0026879 | A1 * | 3/2002 | Goldstein | 101/486 |
| 2002/0029703 | A1 | 3/2002 | Kubota et al. | |
| 2003/0043197 | A1 | 3/2003 | Kremer et al. | |

FOREIGN PATENT DOCUMENTS

| | | | |
|---|---|---|---|
| DE | 43 21 179 | A1 | 1/1995 |
| DE | 195 16 352 | A1 | 11/1996 |
| DE | 102 07 871 | A1 | 10/2002 |
| EP | 0 554 811 | A1 | 1/1993 |
| EP | 1 291 767 | A2 | 12/2003 |
| WO | WO 99/12125 | | 3/1999 |
| WO | WO 9912125 | A1 * | 3/1999 |

OTHER PUBLICATIONS

Sodergard, C., et al. ARGUS—a system for inspecting colour printing quality. Proceedings of the SPIE, 1994, vol. 2353, pp. 513-521.*

Kunzli, H., et al. Mini-targets: a new dimension in print quality control. Proceedings of the SPIE, 1998, vol. 3300, pp. 286-291.*

Deutscher Drucker—May 12, 2002 Germany.

Heidelberg CPC 23—Inline Image Control- Chapter 3 Operatin Manuel.

Heidelberg Electronic Products—PPC 23—PowerPoint-Presentation Druckforum '97.

Helmut Teschner, "Offset drucktechnik, Technologien und Werkstoffe in der Druckindustrie", Fach Schriften Verlag (Germany, 1989).

* cited by examiner

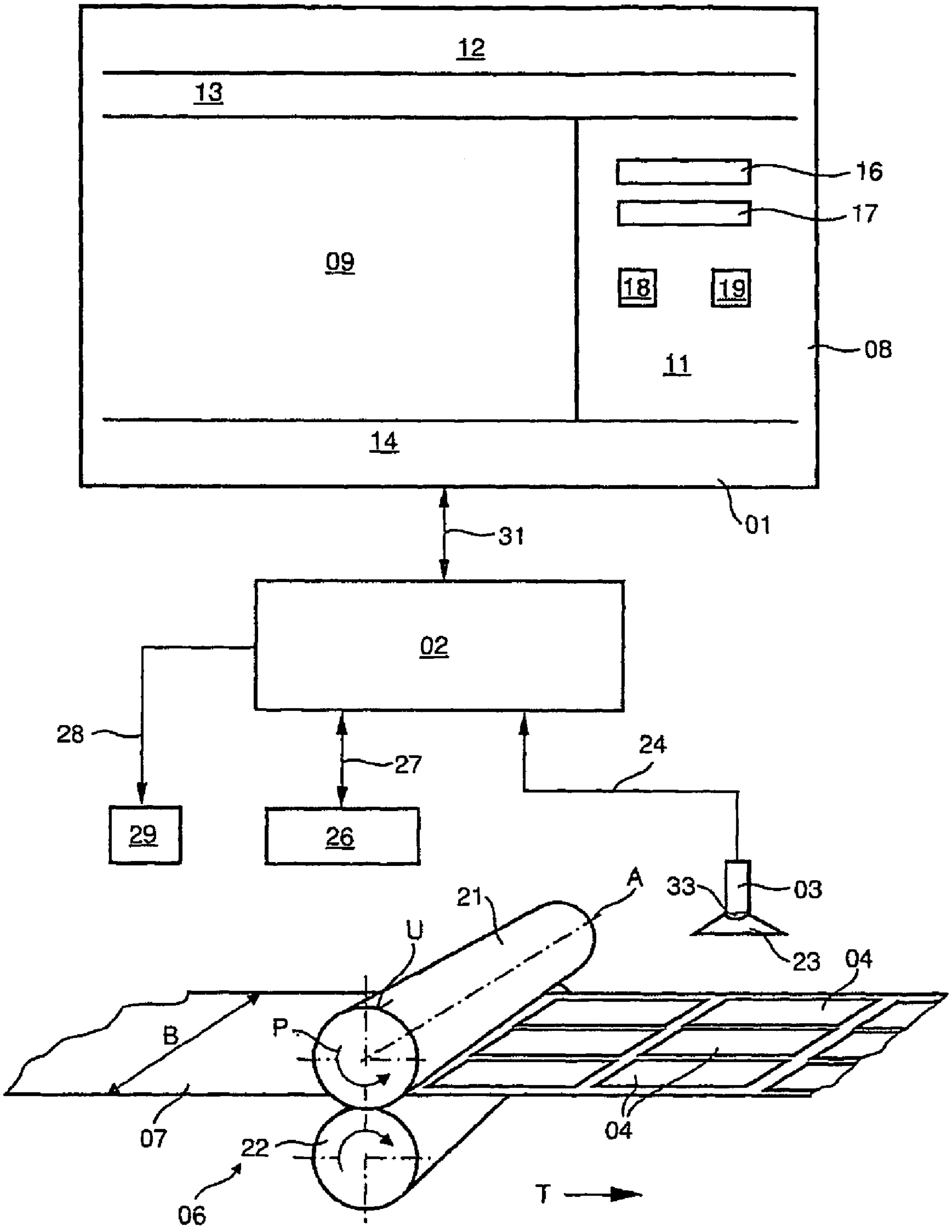
12
13
16
17
09
18
19
11
08
14
01
31
02
28
27
24
29
26
A
21
33
03
U
23
04
P
B
07
04
22
06
T

SYSTEM FOR AUTOMATIC QUALITY INSPECTION OF A PRINTED IMAGE, COMPRISING AN IMAGE SENSOR, EVALUATION UNIT AND DISPLAY

CROSS-REFERENCE TO RELATED APPLICATIONS

This application is the U.S. national phase, under 35 USC 371, of PCT/EP2004/050662, filed Apr. 30, 2004; published as WO 2004/096547 A2 and A3 on Nov. 11, 2004, and claiming priority to DE 103 19 771.0 filed May 2, 2003, the disclosures of which are expressly incorporated herein by reference.

FIELD OF THE INVENTION

The present invention is directed to systems for inspecting a printed image. The printed image is captured by an image sensor, and is displayed on a display device. The display device forms a multiple part display, some part of which can be used to control a printing press.

BACKGROUND OF THE INVENTION

A device for detecting printing errors or other errors in a printing press is known from EP 0 554 811 A1. At least two cameras, with different image definitions, are arranged one behind the other at the end of the printing process in the production direction of a web or a sheet and forward their respective output signals to a computer. A monitor and a keyboard are connected to the computer. The camera which is first in the production direction, and which preferably is a line camera, whose image taking is synchronized with the production speed of the printing press, has a coarser definition than the following second camera, which preferably is a CCD area camera. Images of zones of the web or the sheet, which are not imprinted, or which are imprinted in a uniform color, and which are recorded by the camera which is first in the production direction, control the camera which is second in the production direction, shifting it transversely to the production direction. The second camera then no longer systematically detects these zones, but records images of high resolution, of zones in which the camera which is first in the production direction has already detected errors. An image recorded by the first camera or by the second camera can be represented on the monitor and can be compared with a previously entered reference image by operating a keyboard.

A system for operating a printing press is known from EP 1 291 767 A2. Two different applications are simultaneously displayed in two differently sized windows of a monitor which is assigned to the printing press. An original of the printer's copy is represented in one window, and in the other window functions for operating the printing press are displayed.

A device for controlling a printing press is known from US2002/0029703 A1. Various types of information regarding the printing process and status information are represented on the monitor of a PC. The control information regarding the printed pages is represented in the form of symbols.

A method and a device for controlling or for regulating operational processes of a machine in connection with print technology are known from DE 43 21 179 A1. At least one image-taking device is directed onto the surface of a printed product. The image-taking device sends its information, representing the surface of the printed product, to a control and regulating circuit. A reference image, an actual image and a reference image can be selectively represented either individually, or in partial images on a display screen which is connected with the control and regulating circuit. In the case of an impermissible deviation of the actual image from the reference image detected by the comparison device of the control and regulating circuit, an error signal can be issued.

In the technical manual "Offsetdrucktechnik" by Helmut Teschner, 10th ed. 1997, and published by Fachschriftenverlag, Fellbach, ISBN 3-921217-14-8, embodiments of a control console "Heidelberg CPC" are described on pages 10/108 to 10/117. The control console is a part of a computer-supported system for quality monitoring, and for quality control of printed products produced by a printing press. The control console has, inter alia, a plurality of different operating elements in a console or in a keyboard, which keyboard is part of the control console, and is usable for controlling an ink metering system which is arranged in the printing press. The quality control is performed by the use of densitometry or of spectral photometry. The control console provides an option to a pressman for checking print samples which are taken from the running production and to then perform corrections, which are considered to be required, by actuating operating elements of the printing press.

SUMMARY OF THE INVENTION

The object of the present invention is directed to producing systems for inspecting a printed image.

In accordance with the present invention, this object is attained by providing a system for inspecting a printed image. The system has at least one evaluating unit, a display device, and an image sensor. The image sensor records an image. The evaluating unit receives data, which is correlated to the recorded image, and evaluates the data by comparing it to prior images or to a reference image. The display device includes a graphics-capable display area with several window-like sections that can be controlled individually by the evaluating unit. One of the sections shows an image. Another of the sections of the display device has an input field or an operating field for setting and operating the evaluating unit or the press.

The advantages which can be achieved by the present invention consist, in particular, in that a system is made available for inspecting a printed image, which system operates during the running production of the printing press, and without the removal of a sample. The parametrization and operating area of the system can be set flexibly and use-relevant, preferably by the use of input aids integrated in the display face, and is comfortable to use. The entire information, that is required by a respective group of users, is displayed clearly structured and openly on the same display face. The system can be easily expanded for performing control and regulation tasks. Shortcomings in quality of the printed images produced by the printing press, and detected by the system during the inspection, are displayed and preferably are logged in. When these images are used, they automatically lead to the identification or to the removal of unsatisfactory print images by the system.

BRIEF DESCRIPTION OF THE DRAWING

A preferred embodiment of the present invention is represented in the sole drawing and will be described in greater detail in what follows.

DESCRIPTION OF THE PREFERRED EMBODIMENT

In a greatly simplified representation, the sole drawing shows a display device 01, an evaluating unit 02, an image sensor 03 and several printed images 04, which have been applied by a printing press 06 to an imprint substrate 07. The printing press 06 is embodied, for example, as a rotary printing press with at least one printing unit. The printing unit has at least one forme cylinder, which is not specifically represented, and which supports at least one printing forme, and a transfer cylinder 21, which is working together with the forme cylinder. The transfer cylinder 21 is placed against a counter-pressure cylinder 22, which extends parallel with the axis A of the transfer cylinder. The counter-pressure cylinder 22 can be embodied as a second transfer cylinder, which itself works together with at least one further forme cylinder, which is also not specifically represented assigned to it. In the embodiment represented in the sole drawing figure, the transfer cylinder 21 transfers two printed images 04, located one behind the other, in the direction of its circumference U, for each revolution. Three printed images 04 are arranged side-by-side, in the axial direction of the transfer cylinder, so that a total of six printed images 04, for each revolution of the transfer cylinder 21 in its production direction P are applied to the imprint substrate 07, which substrate 07 is being passed between the transfer cylinder 21 and the counter-pressure cylinder 22 in the transport direction T.

The imprint substrate 07 may be, for example, a printed sheet 07 or a printed web 07 of material, and preferably is a paper web 07. In the course of the printing process, the printing press 06 either prints a sequence of printed images 04, following each other in the transport direction T, on a continuous web 07 of material, or it prints a sequence of printed sheets 07, each with at least one printed image 04, wherein the printed sheets 07 are being transported in the transport direction T.

An image-taking area 23 of the image sensor 03 such as, for example, a color camera 03, and preferably a digital semiconductor camera 03 with at least one CCD chip, is directed onto the imprint substrate 07. The image-taking area 23 of the image sensor 03 records at least a partial picture of a printed image 04 which is applied to the imprint substrate 07. For example, the image sensor 03 is arranged at the outlet of the last printing group of the printing press 06, which last printing group is last in the transport direction T of the imprint substrate 07. The image sensor 03 detects, for example, the entire width B of the imprint substrate 07, wherein the width B of the imprint substrate 07 extends transversely to the transport direction T. The image sensor 03 delivers an image, which image can be electronically evaluated, of at least an area of a printed image 04, but preferably delivers an image of the entire width B of the imprinted imprint substrate 07, on which at least one printed image 04 has been applied to the imprint substrate 07 along the width B of the imprint substrate 07. The image sensor 03 is configured as an area camera 03 or as a line camera 03, which has one optical arrangement 33, and in particular has a lens 33, which is suitable for detecting the desired image-taking area 23. An alternative arrangement of the image sensor 03 is one in which it is not arranged directly at the printing group, but is located at a device or machine, which is not specifically represented, which is located downstream of the printing press 06 and which conveys and/or processes the printed images 04 that are produced by the printing press 06.

The evaluating unit 02, which, in particular, is embodied as a program-controlled electronic computer installation 02, and which is arranged, for example, in a control console that is part of the printing press 06, receives data correlated with the recorded image via a data transfer path 24, such as, for example, a data line 24. The image sensor 03 transmits these data to the evaluating unit 02 or at least keeps them ready for call-up. The data, which is correlated with the recorded image, is edited in the evaluating unit 02 in such a way that the image can be represented on a display area 08 of the display device 01. The display device 01 and the evaluating unit 02 are preferably connected with each other via a bi-directional data transfer path 31 or data line 31. The image sensor 03, the evaluating unit 02 and the display device 01 together constitute a system for inspecting at least a portion of a printed image 04 applied to an imprint substrate 07. However, the functions of this system can also be expanded to include control and regulating tasks, as will be explained subsequently.

A memory device 26 is assigned to the evaluating unit 02, in which memory device 26 data of at least a portion of the images being recorded and/or data regarding a portion of an image previously recorded can be stored. The stored data, at least the data of a specific image, is used as a reference for comparison with data of continuously, actually recorded images. The connection between the evaluating unit 02 and the memory device 26 consists of a bi-directional data transfer path 27, or data line 27.

It is possible, by the use of a comparison, that is performed in the evaluating unit 02, of the data of an actually recorded image with the data of a previously recorded image, or with the data of a stored reference image, to determine, in the running printing process, a value, such as, for example, an increase in shading value in successively recorded printed images 04. It is also possible, for example, to detect, by the use of a comparison, to what extent the registration in successive images exists, in other words to determine to what extent there exists a congruent agreement of the position of the printed image or printing area between recto and perfecting printing, or also between the top and underside, when producing products which are imprinted on both sides. A register can be checked, in the same way, by use of the comparison, to determine the intended exactitude of the individual partial colors when being printed on top of each other during multi-color printing. The increase in shading value, the registration accuracy, as well as the register accuracy, play important roles in multi-colored printing.

The printed image 04 can also be judged qualitatively by the use of a recognition characteristic which distinguishes the printed image 04. Either the recognition characteristic alone, or the printed image 04, together with the recognition characteristic, are checked by a comparison with a reference image to determine whether the recognition characteristic, or the printed image 04 with the recognition characteristic, belong to a specific class of recognition characteristics or of printed images 04, and to determine whether the recognition characteristic has a defined geometric contour and/or a specific relative arrangement with respect to at least one further recognition characteristic. These checks are preferably performed with a tolerance for errors, so that the judgment takes place while taking permissible tolerance limits into consideration.

It is advantageous if the checks to be made on the printed images 04 are performed in the evaluating unit 02 in parallel routines and therefore, for all practical purposes, are performed simultaneously. The result of a check can be used to trigger an actuating command for use in correcting a deviation which is detected in an actually recorded and checked image from a reference value which is decisive for the check. The evaluating unit 02 can therefore be equipped with at least one output, from which at least one output an actuating command is conducted, via a data transmission path 28, to an actuating drive 29, which actuating drive 29 affects the printing operation in the printing press 06. Such an actuating drive 29 may be provided, for example, in connection with an inking system or with a dampening system, which systems are part of the printing group, a circumferential registration device, a lateral registration device, or to accomplish a diagonal shifting of at least one of the forme cylinders with respect to its assigned transfer cylinder 21. The output of the evaluating unit 02 can also be used for activating, for triggering or for shutting off an illumination arrangement, which is not specifically represented for the image sensor 03, such as, for example, a flash lamp.

The display device 01 has a graphics-capable display area 08, which is provided with several window-like sections 09, 11, 12, 13, 14, which can each be differently controlled by the evaluating unit 02. A first such section 09 selectively shows an actually recorded image, a previously recorded image or a reference image. A second such section 11 has at least one input field 16, 17 and/or at least one operating field 18, 19 for use in setting and/or for operating the evaluating unit 02 and/or for use in setting and/or for operating the printing press 06. The system can be set with regard to at least one parameter. A function to be executed by the system can be called up and/or triggered, and/or an actuating command to be issued by the evaluating unit 02 can be entered into the system or can be selected from a plurality of preset actuating commands by use of the input field or fields 16, 17 and/or by use of the operating field or fields 18, 19.

Because of the display area 08 being structured in sections 09, 11, 12, 13, 14, which can each be operated independently of each other, or which can simultaneously be controlled by the use of different information contents by the evaluating unit 02, the display area 08 which, may be, for example, a part of a control console which is part of the printing press 06, is provided with a clear and easily usable operating area, on which operating area it is possible to display at least information relevant to the inspection of a printed image 04. On the same display area 08, at least one operating element may be simultaneously provided, at least in one of the sections 09, 11, 12, 13, 14, in order to react to the actually displayed information by the use of at least one command to the system. The command affects the process performed by the printing press 06 in such a way that it counteracts a detected deviation in the inspected image from at least one reference value. For the representation of information on the display area 08, it is advantageous to employ colors, and in particular to employ different colors for presenting different information.

The display device 01 and the evaluating unit 02 can be configured in such a way that actually recorded images are continuously displayed in the first or image display section 09. As soon as a recorded image indicates that the printed image 04 shown exceeds at least one previously set permissible tolerance limit, with respect to its quality to be checked, the display of this image is frozen, so to speak, in that the display of the continuously recorded images is stopped. In a variation of this embodiment, the display device stops at an image which exceeds at least one of the previously set permissible tolerance limits for at least a length of time, which is preferably adjustable, before the display of the continuously recorded images is again continued with the actually recorded image. The length of time for stopping the display can be 5 to 15 seconds, for example, and preferably is 10 seconds.

A printed image 04, whose evaluated image shows that it exceeds at least one previously set permissible tolerance limit, with respect to its quality to be checked, can be marked by the use of a marking arrangement, which is not specifically represented, which marking unit is connected with the system, and/or the defective printed image 04 can be removed by a conveying arrangement, which is also not specifically represented. The system can be set in such a way that, when it is determined that a permissible tolerance limit has been exceeded, the evaluating unit 02 will automatically trigger the marking of the printed image 04 by the marking arrangement and/or the removal of the printed image 04 by the conveying arrangement. To accomplish this, the evaluating unit 02 issues an appropriate actuating command at its output, for example. The conditions, which are required for triggering this actuating command, can preferably be selected and can be set at the display area 08.

A third section 12 is preferably also provided on the display area 08. This third section 12 displays at least a designation of the evaluating unit 02 and/or of a job actually being processed in the printing press 06. It is also possible to show, in this third section 12 of the display area 08, for example, whether the actual job has undergone a change of its parameters which are relevant to the printing process.

The display area 08 can also have a fourth section 13. This fourth section 13 has at least one menu with a menu structure, which opens, when selected, and which contains at least one function for operating and/or for setting the evaluating unit 02, and/or for operating and/or for setting the printing press 06. Thus, the function which can be selected in the fourth section 13 of the display area 08 relates, for example, to the setting up of a new job to be processed by the printing press 06, or to the processing or to the changing of an existing job. As a function of the selection made from the menu, the second section 11 of the display area 08 sets a fixed sequence of input fields 16, 17 and/or of operating fields 18, 19 for setting and/or for operating the evaluating unit 02 and/or for setting and/or for operating the printing press 06. In this way, a user is guided with respect to a function to be set in the system and/or in the printing press 06 in such a way that all of the settings which are required for the desired functions are consistently sequentially interrogated, and wherein a following interrogation requires that the previous interrogation has been answered.

In the same way, an image, which was stored in the memory device 26, can be selected from the menu which can be displayed in the fourth section 13 of the display area 08. The selected image can be displayed in the first section 09 of the display area 08.

A further function which can be selected in the fourth section 13 of the display area 08 from the menu can, for example, consist of fixing one or several tolerance limits for evaluating the quality of the printed images 04 generated by the printing press 06, or of taking the system out of operation by use of an orderly switch-off of its functions. The latter preferably can only be performed when the printing press 06 is stopped and after its execution is announced by an appropriate report. In connection with the evaluation of a quality characteristic, for which a permissible tolerance limit is to be fixed, it is advantageous to store a plurality of different sensitivity levels in the evaluating unit 02, such as, for example, between five and twenty such sensitivity levels, and preferably ten such sensitivity levels. A suitable sensitivity level can be selected and set for the system by use of the menu displayed in the fourth section 13 and/or in the input fields 16, 17 and/or in the operating fields 18, 19 in the second section 11.

A fifth section 14 can also be provided on the display area 08. The fifth section 14 shows at least a status of the evaluating unit 02 and/or the printing press 06. Status indications in this fifth section 14 can, for example, be provided in the form of a pictograph.

It is of advantage, in accordance with the present invention, if the display area 08 shows the first section 09 and the second section 11 arranged side-by-side, and at least two of the five sections 09, 11, 12, 13, 14, and preferably all five sections 09, 11, 12, 13, 14, simultaneously. The display area 08 can show the third section 12 at its upper edge, the fourth section 13 below the third section 12, the fifth section 14 at its lower edge and the first section 09 and the second section 11 between the fourth section 13 and the fifth section 14, as depicted in the sole drawing FIGURE. Preferably the third, fourth and fifth sections 12, 13, 14 are each configured in a linear shape. The display area 08 typically permanently displays at least the fourth section 13 and the fifth section 14.

Advantageously, at least the first section 09 of the display area 08 is embodied to be video-capable and in a position in which it is capable of displaying a sequence of several images which follow each other rapidly. Therefore, the first section 09 of the display area 08 is capable of sequentially displaying images of printed images 04 printed on the imprint substrate 07, or of images of at least portions of the printed images 04 printed on the imprint substrate 07, which images or portions of images were sequentially recorded by the image sensor 03. These images or portions of images are displayed in the way in which the printed images 04, which had been recorded completely, or at least partially, by the image sensor 03, which is stationary with respect to the printing press, pass the image-taking area 23 of the image sensor 03 at the transport speed of the imprint substrate 07. An image reproduction frequency of the first section 09 of the display area 08 is therefore at least as fast as an image recording frequency of the image sensor 03. Thus, in a manner corresponding to the transport speed of the imprint substrate 07, it is possible to display, for example, five or more printed images 04 per second in the first section 09 of the display area 08. This movie-like display of the printed images 04 in the first section 09 of the display area 08 has the advantage that, for example, a tendency of the sequentially displayed images to color deviations can be detected very rapidly, even though at a display speed of several images per second, the individual printed image 04 can no longer be discretely inspected by the operators of the printing press. By such a display of a sequence of printed images 04, it is also detectable in which areas of the sequentially imprinted printed images 04 such color deviations occur, so that the application of color by the inking system can be zonally updated. In turn, a shifting of the zone screws of the inking system, as initiated in this way, can then be detected by the operators of the printing press within a short period of time by a review of the movie of the printed images 04 running in the first section 09 of the display area 08 by the noting of a reversal of the prior tendency toward a color deviation. For video capability, the electronic control of the display area 08, in particular, should be configured in such a way that video signals can be processed and displayed by it. For this purpose, the control device must be able, for example, to process a sufficiently large signal bandwidth at high speed.

The display area 08 has at least one touch-sensitive field for operating and/or for setting the evaluating unit 02 and/or the printing press 06. In the second section 11, in particular, the input field 16, 17 and/or the operating field 18, 19 are embodied as touch-sensitive fields which are usable for setting and/or for operating the evaluating unit 02 and/or for setting and/or for operating the printing press 06. Thus, the display area 08 is preferably configured as a touch screen.

In their preferred embodiments, the display device 01 and/or the evaluating unit 02 have at least two modes of operation. These at least two modes of operation differ in a different design of the display area 08 and/or in the amount, and in particular the number, of the displays which are presented on the display area 08 and/or in the amount of operations and/or the settings of the evaluating unit 02 and/or the printing press 06. A change from an actually set mode of operation, to a mode of operation of a larger size in regard to the displays and/or to the operations and/or to the settings of the evaluating unit 02 and/or to the printing press 06 preferably is a function of a proof of authorization. This proof of authorization consists, for example, of a password or of an identifying characteristic of the user, of which the system is to be advised by an input for verification. Also, a sequence of the input fields 16, 17 and/or of the operating fields 18, 19 displayed on the display area 08 can depend on the mode of operation per se. For example, in a defined mode of operation, non-released input fields 16, 17 and/or the operating fields 18, 19 are not even displayed or are locked out, so that the function otherwise connected with the now locked out or not displayed input fields 16, 17 and/or the operating fields 18, 19 cannot be performed. For example, the modes of operation may differ in that, in one mode of operation, only functions required for executing a printing order are displayed, while in another mode of operation, for example, all of the settings of the system, up to the settings of the image sensor 03 and those of the printing press 06, can be changed.

The evaluating unit 02 preferably also has a learning mode for use in determining and/or for defining at least one reference image, and a work mode for comparing an actually recorded image with the reference image. The display device 01 indicates, in its first section 09, a deviation of the actually recorded image from the reference image detected in the test performed by the evaluating unit 02. The number of printed images 04 to be evaluated in the learning mode can be input at the display area 08 and can be variably adjusted. At the termination of the learning mode, the system can change, preferably automatically, into the work mode.

It is of advantage if the system in accordance with the present invention, and in particular the display area 08, has a function for taking back or for cancelling an accidentally or an erroneously performed input occurring at an input field 16, 17 and/or at an operating field 18, 19 and/or an erroneous selection from the menu displayed in the fourth section 13 of the display area 08. Also, data stored in the memory device 26, which data is no longer needed, can be completely or partially cancelled, such as, for example, by actuating a specific operating field 18, 19.

The display area 08 can, for example, indicate, in particular in its fifth section 14, how many printed images 04 as a whole and/or how many printed images 04, which are considered to be satisfactory, have already been produced by the printing press 06 in the course of an actual job. A statistical function, which can be called up from the menu that can be displayed in the fourth section 13 of the display area 08, can display information regarding an individual image and/or several images. This information can be stored in the memory device 26, preferably limited over time. As the result of a command which can be input into the system, this information can be conducted to a printer, which is not specifically represented, which printer is connected with the evaluating unit 02, and such information can be printed out there.

To perform the above-described functions, and in particular to perform the functions in connection with the display area 08, the evaluating unit 02 advantageously has an operating system which supports a method for inter-process communication, which is designed for exchanging complex data structures. For example, it is possible to provide Windows NT4.0® (or higher) or Windows 2000® (or higher) as the operating system. Communications can take place in accordance with the COM (Common Object Model)/DCOM (Distributed Component Object Model) standard.

While a preferred embodiment of a system for inspecting a printed image, in accordance with the present invention, has been set forth fully and completely hereinabove, it will be apparent to one of skill in the art that changes in, for example, the specific structure of the cylinders in the printing press, the drive for the imprint substrate and the like could be made without departing from the true spirit and scope of the present invention which is accordingly to be limited only by the appended claims.

What is claimed is:

1. A system for inspecting a printed image comprising:

an image sensor, said image sensor being adapted to record an image, which recorded image at least partially pictures the printed image, and wherein said recorded image is one of a sequence of images recorded by said image sensor of successive ones of said printed image produced during running production of a printing press on an imprint substrate, said image sensor having an image recording frequency corresponding to a transport speed of said imprint substrate during said running production of said printing press;

a control console for said printing press;

at least one evaluating unit forming a first part of said control console, said evaluating unit including a memory and being adapted to receive data from said image sensor, said data being correlated with said recorded image of said ones of said sequence of said images recorded by said image sensor of successive ones of said printed image, said evaluating unit including means for evaluating said data correlated with said printed image by comparison of said recorded image data with image data of at least one of a previously recorded image and a reference image stored in said memory, said evaluating unit also being usable to control said printing press; and a display device forming a second part of said control console, said display device having a graphics-capable display area with a plurality of independently operable window-like sections, each of said window-like sections being individually controllable by said evaluating unit, a first one of said independently operable window-like sections selectively showing one of said data correlated with said one of said sequence of images recorded by said image sensor of successive ones of said printed image, a previously recorded image and a reference image retrieved from said memory, a second one of said independently operable window-like sections of said display device having at least one of an input field and an operating field, said input field and said operating field of said second one of said independently operable window-like sections of said display device being operable to selectively set and to operate said evaluating unit and to set and to operate said printing press, said first section and said second section of said display device being simultaneously displayed on said graphics-capable display area, said first section having an image reproduction frequency and being usable to display said data of said sequence of said successive ones of said printed image, said image reproduction frequency being at least as great as said image recording frequency corresponding to said transport speed of said imprint substrate during said running production of said printing press, said first section being adapted to display a deviation tendency and location of said display of said sequence of said successive ones of said printed image recorded by said image sensor during said running production of said printing press, said deviation tendency being detected when said data of said sequence of said successive ones of said printed image recorded during said running production of said printing press exceeds a permissible tolerance level in a quality of said printed images to be evaluated and further exceeds a display speed usable for discrete inspection by an operator of said printing press, said second section being adapted to trigger an actuating command for use by said printing press to correct said detected deviation tendency of said sequence of said successive ones of said printed image, said evaluating unit having a plurality of stored different sensitivity levels of a quality characteristic of said printed image to be evaluated and for which a permissible tolerance limit is to be determined, a suitable one of said plurality of stored different sensitivity levels being selectable and set for said evaluating unit by one of said input field and said operating field of said second section of said display device.

2. The system of claim 1 further including a learning mode in said evaluating unit adapted for determining said reference image, and a work mode for comparison of said actually recorded image with said reference image, said display device being adapted to include, in said first section, said deviation from said reference image, a number of said printed images to be evaluated in said learning mode being set in said second section.

3. The system of claim 1 further including a third section of said display area, said third section being adapted to indicate one of a designation of said evaluating unit and a job being processed in said printing press.

4. The system of claim 3 further including a fourth section of said display area and having at least one menu with a menu structure and having at least one function for one of operating and setting one of said evaluating unit and said printing press.

5. The system of claim 4 further including a fifth section of said display area, said fifth section being adapted to display at least a status of one of said evaluating unit and said printing press.

6. The system of claim 1 wherein said first section and said second section are arranged side-by-side in said display area of said display device.

7. The system of claim 1 wherein said plurality of sections can be controlled individually at the same time.

8. The system of claim 5 wherein said third section is located at an upper edge of said display area, said fourth section is located below said third section, said fifth section is located at a lower edge of said display area and said first and second sections are located between said fourth and fifth sections.

9. The system of claim 5 wherein each of said third, fourth and fifth sections has a linear shape.

10. The system of claim 1 wherein at least said first section is video-capable.

11. The system of claim 5 wherein at least said fourth and fifth sections are permanently displayed on said display area of said display device.

12. The system of claim 1 wherein said display area includes at least one touch-sensitive field.

13. The system of claim 1 wherein at least one of said display device and said evaluating unit has at least two modes of operation which differ in one of a different design for said display area, a number of said window-like sections in said display area, operation of said evaluating unit, and a setting of said evaluating unit and said printing unit.

14. The system of claim 13 further including a proof of authorization requirement in connection with a change from one of said modes of operation to another of said modes of operation.

15. The system of claim 1 wherein said evaluating unit includes a learning mode adapted to determine said reference image, and a work mode adapted to compare said actually recorded image with said reference image, said display device being adapted to include, in said first section, said deviation from said reference image.

16. The system of claim 15 wherein said evaluating unit automatically changes into said work mode upon termination of said learning mode.

17. The system of claim 1 further including a memory device adapted to store data of at least a portion of said recorded image.

18. The system of claim 17 wherein said recorded image stored in said memory device can be selected for display in said first section of said display area.

19. The system of claim 4 wherein said at least one function selectable from said at least one menu in said fourth section of said display area is directed to one of selecting a new job and changing an existing job of said printing press.

20. The system of claim 19 further wherein in response to said selections from said menu, said second section of said display area will select a fixed sequence of one of input fields and operating fields for one of setting and operating one of said evaluating unit and said printing press.

21. The system of claim 20 wherein a sequence of said one of said input fields and operating fields displayed on said display area is a function of an actually set mode of operation.

22. The system of claim 1 further including means to cancel an erroneously made input in said at least one input field.

23. The system of claim 1 wherein said display area is a color display area.

24. The system of claim 23 further including different colors adapted to display different information in said different colors.

25. The system of claim 1 further including a reversion of said first section of said display area back to a display of said sequence of said several ones of said actually recorded images at an end of a specified time period.

26. The system of claim 25 wherein a length of said time period is adjustable.

27. The system of claim 1 wherein a suitable one of said plurality of different sensitivity levels is selectable by said input field of said second section.

28. The system of claim 1 further wherein between five and twenty of said plurality of different sensitivity levels are provided.

29. The system of claim 4 wherein a sensitivity level is selectable using said menu displayed in said fourth section.

30. The system of claim 1 further including a marking arrangement adapted to mark one of said sequence of ones of said printed image whose permissible quality tolerance level of said printed image to be evaluated is exceeded.

31. The system of claim 1 further including a conveying arrangement wherein said evaluating unit activates said conveying arrangement to remove a printed image whose permissible quality tolerance level of said printed image is exceeded.

32. The system of claim 30 wherein said permissible quality tolerance level is set at said display area.

33. The system of claim 32 wherein said permissible quality tolerance level is selectable at said display area.

* * * * *